United States Patent [19]

Ginzburg et al.

[11] Patent Number: 4,680,978
[45] Date of Patent: Jul. 21, 1987

[54] ROLLING MILL STRIP TENSION MONITORING AND SHAPEMETER ASSEMBLY

[75] Inventors: Vladimir B. Ginzburg; G. Brian Jones, both of Pittsburgh, Pa.

[73] Assignees: Wean United Rolling Mills, Inc.; International Rolling Mill Consultants, Inc., both of Pittsburgh, Pa.

[21] Appl. No.: 778,319

[22] Filed: Sep. 20, 1985

[51] Int. Cl.⁴ .......................... G01L 5/04; B21C 51/00
[52] U.S. Cl. ........................................ 73/862.07; 72/17
[58] Field of Search ............... 73/862.07, 862.48, 159; 72/9, 17

[56] References Cited

U.S. PATENT DOCUMENTS

| | | | |
|---|---|---|---|
| 2,240,184 | 4/1941 | Hathaway | 73/779 X |
| 2,674,127 | 4/1954 | Garrett et al. | 73/862.07 X |
| 2,809,519 | 10/1957 | Kaestner | 73/862.07 X |
| 3,084,297 | 4/1963 | Glerum | 73/779 X |
| 3,334,508 | 8/1967 | Martin | 73/862.07 X |
| 3,442,104 | 5/1969 | Misana et al. | 72/9 |
| 3,475,935 | 11/1969 | Kajiwara | 72/9 |
| 3,581,536 | 6/1971 | Terwilliger | 72/9 |
| 4,116,029 | 9/1978 | Fabian et al. | 72/34 |
| 4,188,809 | 2/1980 | Ishimoto et al. | 72/17 |
| 4,269,051 | 5/1981 | Clarke et al. | 72/9 |
| 4,289,005 | 9/1981 | Cabaret et al. | 72/12 |
| 4,332,154 | 6/1982 | Nordvall | 72/31 |
| 4,512,170 | 4/1985 | Hsu | 72/17 |

Primary Examiner—Charles A. Ruehl
Attorney, Agent, or Firm—Arnold B. Silverman

[57] ABSTRACT

A rolling mill strip tension monitoring assembly has a roll supporting structure which supports a plurality of pivotally mounted rolls. A sensor support is movably secured to the roll supporting means such that movement of the rolls other than axial rotational movement will effect a change in relative position between the noncontacting sensor array and the roll support. Sensors may consist of one or more elongated transducer array which may be of the induction type. Apparatus for comparing the position of a rolls with an adjacent roll may be employed. Apparatus for processing the signals.

14 Claims, 10 Drawing Figures

ROLLING MILL STRIP TENSION MONITORING AND SHAPEMETER ASSEMBLY

BACKGROUND OF THE INVENTION

1. Field of The Invention

The present invention relates to improved apparatus for monitoring tension, shape and strip position of strip being rolled on a rolling mill.

2. Description of The Prior Art

It has been known to employ segmented rollers in contact with strip in a rolling mill environment in order to determine shape or flatness of strip by strain-gauge type transducers mounted on the arm supporting the rolls. One of the main disadvantages of this approach is the difficulty with maintenance as a result of the need to interrupt the rolling process in order to remove transducers which might need to be replaced, and to replace such transducers or to service other components of the assembly. These units have also been very heavy and cumbersome in construction (high inertia) which detract from the effectiveness as a measuring device. This characteristic also made such devices in many cases unfit for interstand looper uses in a tandem hot strip mill.

It has been known in the rolling mill environment to monitor strip tension or flatness by measuring forces across a roll or a segmented group of rolls. See generally U.S. Pat. Nos. 3,475,935; 4,289,005; and 4,512,170.

U.S. Pat. Nos. 3,581,536 and 4,332,154 disclose segmented roll, contacting sensor systems.

U.S. Pat. No. 4,116,029 discloses a device which has high inertia rolls and would require prolonged mill shutdown in order to replace the transducers.

U.S. Pat. No. 4,188,809 discloses a segmented roll, noncontacting system wherein the roll surface which is subject to wear is employed as a reference for the sensor. This could interfere with the accuracy of measurement.

See, generally, Proceedings Vol. 1, International Conference on Steel Rolling (Science and Technology of Flat Rolled Products) Sept. 29/Oct. 4, 1980—Tokyo, Japan, published by the Iron Institute of Japan.

There remains, therefore, a need for tension, shape and strip position monitoring means in a roll assembly which will function efficiently and which may be serviced without the need for prolonged interruption in the rolling process.

SUMMARY OF THE INVENTION

The present invention has met the above-described needs by providing a plurality of generally axially aligned strip contacting rolls which are pivotally secured to a roll supporting means. The roll supporting means is in turn movably secured to distance measuring sensor supporting means. It is preferred that there be relative displacement between the roll supporting means and the sensor supporting means. By employing arrays of proximity or position sensors, such as induction transducers, for example, displacement of the rolls will produce a change in position between a transducer associated with a particular roll and thereby produce a responsive change in the output of the transducer.

In one embodiment, plate means are fixedly secured to the roll supporting means and one or more linear arrays of transducers having at least one transducer aligned with each roll are provided. Displacement of the roll will result in responsive movement of the plate means thereby altering the spacing between the transducers and the plate. The output of the sensors made by comparator means is compared in such a manner as the movement of a roll and adjacent rolls are analyzed with the strip tension and lateral position as well as shape being determined.

It is an object of the present invention to provide a strip tension, shape and strip position monitoring assembly for a rolling mill wherein the apparatus may be serviced readily without interruption in the rolling process.

It is a further object of this invention to provide a low inertia monitoring assembly.

It is a further object of the present invention to provide such an assembly wherein a plurality of distance measuring sensors will permit independent comparison of the position of a pair of adjacent rolls and subsequent comparison of the relative positions of all of the rolls.

It is a further object of the present invention to employ at least one linear array of transducers as sensors in such an invention.

These and other objects of the invention will be more fully understood from the following description of the invention, on reference to the illustrations appended hereto.

DESCRIPTION OF THE PREFERRED EMBODIMENTS

Figure 1:
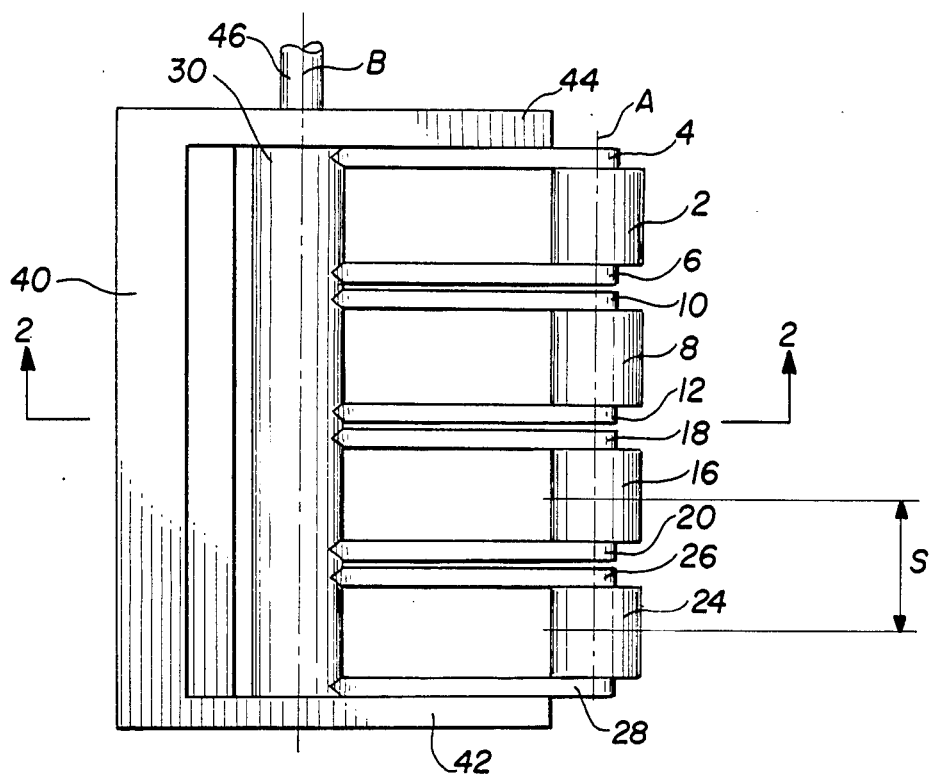
FIG. 1 is a partially schematic top plan view of the strip tension monitoring assembly of the present invention.
Figure 2:
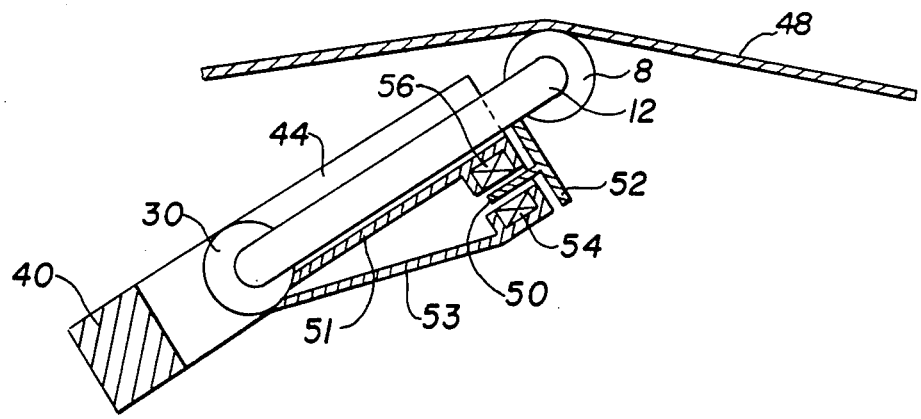
FIG. 2 is a cross sectional illustration of the apparatus of FIG. 1 taken through 2—2 and illustrating a strip in combination therewith.
Figure 3:
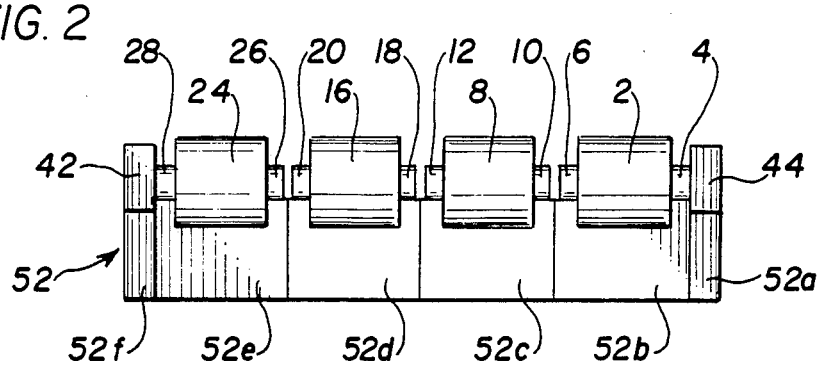
FIG. 3 is a front elevational view of the apparatus of FIG. 1.

Referring now in greater detail to FIGS. 1 through 3, it will be seen that the apparatus of the present invention has a plurality of rolls 2, 8, 16, 24 which are each mounted for axial rotation about axis A. The roll supporting means has a shaft 30 with a series of projecting roll supporting beams which are fixedly secured thereto. Spaced beams 4, 6 rotatably secure roll 2, beams 10, 12 rotatably secure the roll 8, beams 18, 20 rotatably secure roll 16 and beams 26, 28 rotatably secure roll 24. It will be noted that the center spacing of the rolls is S.

Sensor supporting means, in the form shown, is generally U-shaped and has a counterbalance 40 and a pair of generally parallel legs 42, 44. It is preferred that the roll supporting means be movably secured with respect to the sensor supporting means. In the form illustrated in FIGS. 1 through 3, the securement permits relative displacement. Shaft 30 has a shaft extension 46 and is pivotally secured with respect to legs 42, 44 of the sensor supporting means. Shaft 30 is adapted to rotate about axis B.

In the form illustrated in FIGS. 1 through 3, the sensor supporting means has a pair of arms 51, 53 which support respectively, a pair of elongated sensor arrays 54, 56 which are generally aligned with each other and in relative space relationship. A plate member 50 is interposed between the noncontacting sensor 54, 56 and is fixedly secured to the roll supporting means. The gaps between each of the sensor arrays 54, 56 and the associated surface of plate 50 is preferably about 0.200 inch and the range of change of these gaps is about zero to 0.010 inch. A suitable noncontacting position sensor is the Kayman Displacement Transducer marketed by Kayman Instrumentation Corporation of Colorado Springs, Colo. In the form illustrated, the plate means has a generally T-shape and consists of a leg 52 which is secured to the roll supporting means and a leg 50 which is interposed between the sensor arrays 54, 56. It will be appreciated that movement of the rolls will cause responsive movement of plate 50 thereby altering the spacing between the plate 50 and the sensor arrays 54, 56 to provide an indication of the magnitude of change which indication will emerge as an output signal from the sensor arrays 54, 56. It is preferred that a separate plate means 50 be provided for each roll so that independent measurement of each roll position may be established. In this manner comparison of the readings of the sensors for each roll will permit information as to the relative positions of each roll with respect to the other rolls. The plurality of individual plates have been indicated on FIG. 3 as bearing designations 52a–52f. The use of two sensor arrays reduces the temperature effect.

Figure 4:
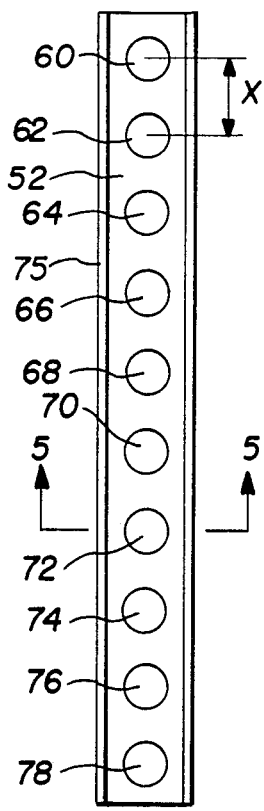
FIG. 4 is a top plan illustration of a form of sensor array employable in the present invention.
Figure 5:
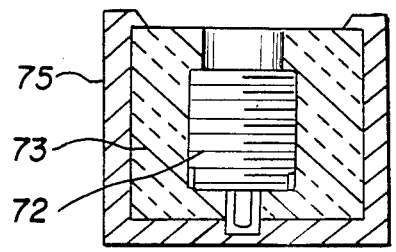
FIG. 5 is a cross sectional illustration taken through 5—5 of the array of FIG. 4.

Referring in greater detail to FIGS. 4 and 5, there is shown a linear array of transducers bearing even numbers 60–78 which are spaced from each other on a center to center basis a distance X. A generally U-shaped frame member 75 supports the transducers. It is preferred that the spacing X be such as to align each individual transducer with a predetermined position on a particular roll. In general, there will be one or two transducers per roll. In a preferred approach, transducers 60, 78 will be aligned with portions 42, 44 of the sensor supporting means and the intermediate transducers 62–76 will have two transducers aligned with each of the rolls. In this manner monitoring of roll displacement which is an indication of the force transmitted to each roll will be provided and shape or strip position may be determined.

As is shown in FIG. 5, the transducer 72 is positioned within the enclosure 75 with a non-metallic isolator means 73 interposed. In general, the transducer will emit an electromagnetic or electric field. Parameters of this field would change with changes in distance between the transducer and plate 50 with the distance from the plate 50 being determined by the reflected signal which the transducer receives in return. This, in turn, is converted to an output electrical signal which contains the distance information.

Figure 6:
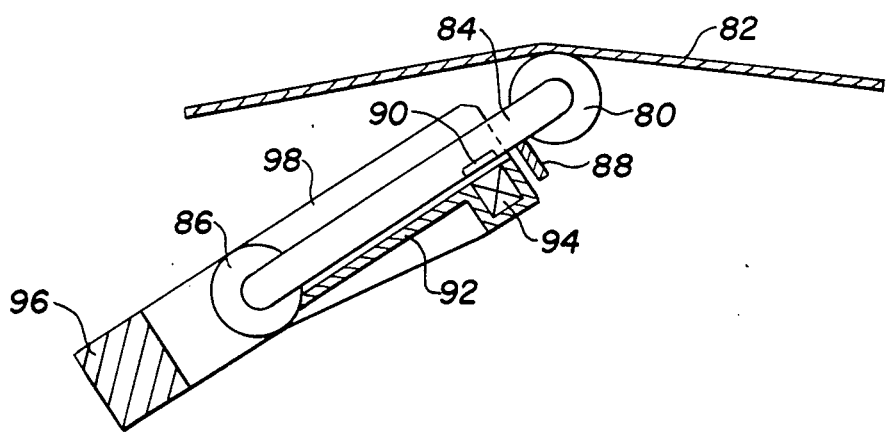
FIG. 6 is a partially schematic cross sectional illustration of another embodiment of the apparatus of the present invention.

Referring to FIG. 6, there is shown a modified embodiment of the invention. Roll 80 which is one of a series of rolls with the rest not being shown, is in surface-to-surface contact with strip 82. Beam 84 and other beams not shown rotatably support the rolls and shaft 86 is rotatably mounted with respect to sensor supporting means which may be generally U-shaped and have a counterbalance 96 and two generally parallel legs of which 98 is illustrated in this figure. Plate 88 shields the sensor assembly. Plate means 90 is fixedly secured to the roll supporting means. In this embodiment, a single array of sensors 94 is secured by arm 92 to the sensor supporting means.

Figure 7:
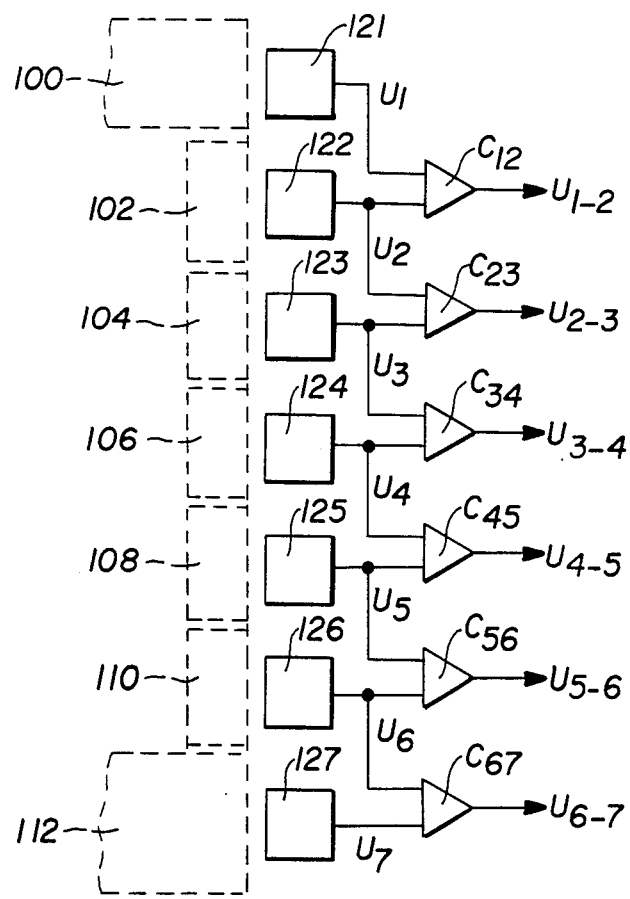
FIG. 7 is a schematic illustration of a functional block diagram usable in the present invention.
Figure 8:
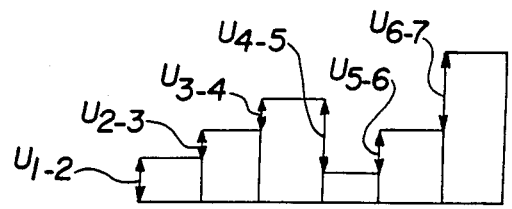
FIG. 8 is a plot of the relative values of the output signals of FIG. 7.

Referring to FIGS. 7 and 8, there is shown schematically the comparison which could be effected in a system having five rolls. The system, as illustrated, has a drive side roll support 100, an operating side roll support 112 and interposed rolls 102, 104, 106, 108, 110 which also would be rotatably supported with interposed beams. Each of these elements has associated with it sensor means 121–127 which may take the form of a single sensor or multiple sensors. The output of each sensor or sensor grouping has been indicated by the numbers $U_1$, $U_2$, $U_3$, $U_4$, $U_5$, $U_6$, $U_7$. In this manner, the direct indication of the function of force transmitted to each roll is provided. Comparator $C_{12}$ provides an output signal which is the difference between the sensors indication of position as provided for sensor means 121 and 122. This has been indicated as $U_{1-2}$. Similarly, the comparator difference of $C_{23}$ is indicated as an output $U_{2-3}$, the output of comparator $C_{34}$ has been indicated each $U_{3-4}$, the comparator $C_{45}$ provides an indication of $U_{4-5}$, the comparator of $C_{56}$ provides an output indication of $U_{5-6}$ and finally comparator $C_{67}$ provides an indication of $U_{6-7}$.

As is shown in the plot contained in FIG. 8, the differences between positions of a given roll and an adjacent roll or other structural member is shown. The variations between the paired grouping is shown in the plot of FIG. 8.

Figures 9, 10:
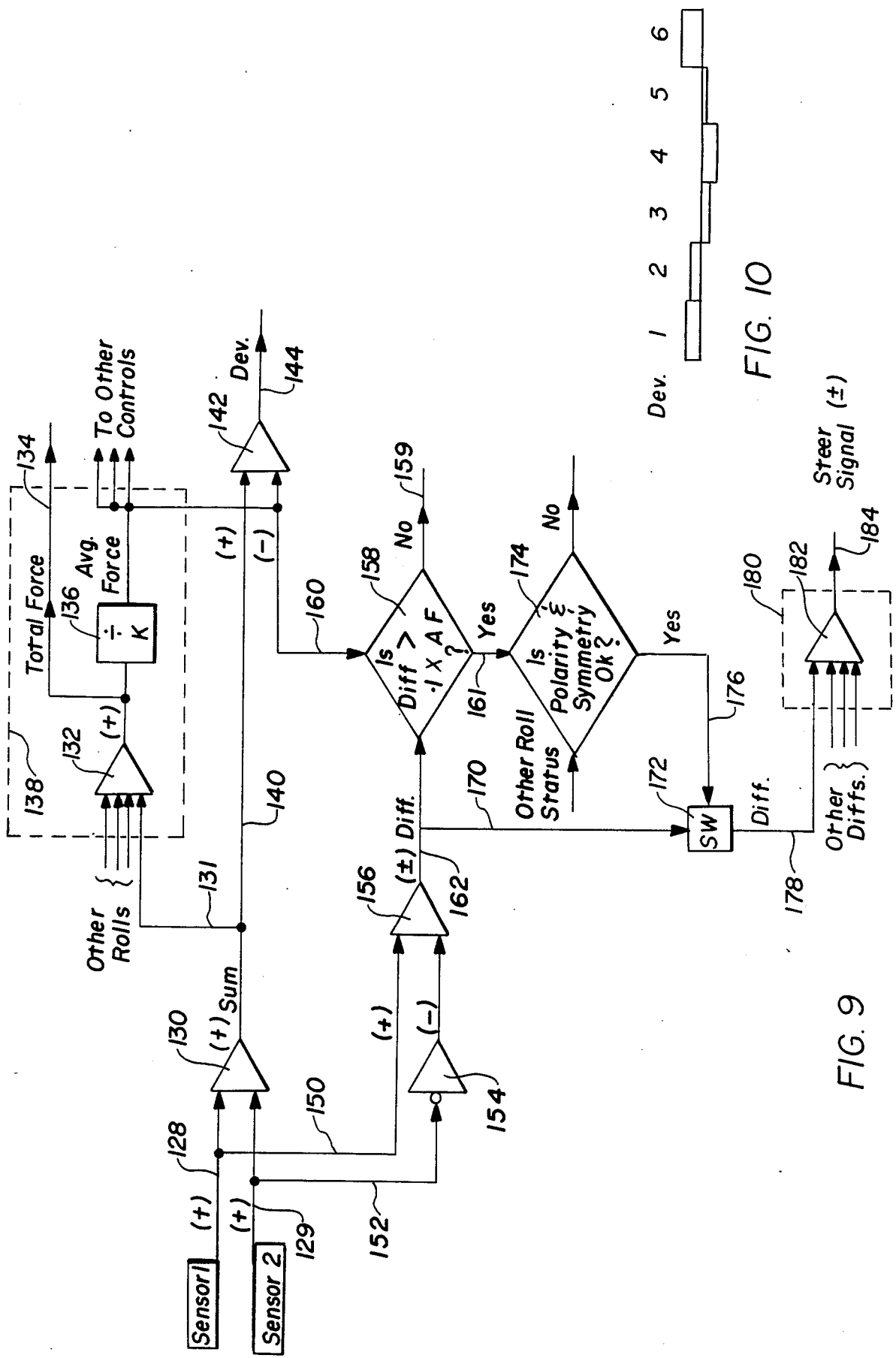
FIG. 9 is another embodiment showing a schematic illustration of a functional block diagram which may be employed in the present invention.
FIG. 10 is a plot of the relative values of the output signals of FIG. 9.

Referring to FIGS. 9 and 10, there is shown an embodiment of the invention wherein there are two sensors for each roll, one at one end of the roll and one at the other end. The control scheme (excluding the portions in the dotted lines) is duplicated for each roll. There is shown a functional block diagram of a means of effecting the comparison accomplished by the present invention. At the left-hand portion of FIG. 9, there are shown two sensors which may be any of the two sensors associated with a particular separate roll. The output signals from the sensors are transported over lines 128, 129 to comparator 130 which adds the two. This sum is provided to comparator 132 over line 131. Also input into comparator 132 are similar sums obtained from other sensors in the system. These inputs are added to produce a total force which emerges on line 134. This signal may be stored, processed or displayed, as desired. Comparator 132 gives an output which is the summation of all rolls whether covered by the strip or not. The factor K is a function of the strip width being rolled such that the output of 136 is the "average force per roll". In 142 this average is compared with the actual force from each roll such that the output of 142 is the "deviation from average" for a particular roll. This deviation is plotted for the various zones in FIG. 10.

Referring still to FIGS. 9 and 10, the output signals from sensor 1 and sensor 2 are provided by lines 150, 152, respectively, to comparator 156. Line 152 also contains signal inversion 154 which serves to reverse polarity of the signal on line 152. The output of comparator 156 emerges on line 162 and is provided to control logic 158 which determines by comparison with the average force signal on line 160 if the signal on line 162 is greater than 0.1 times the average force. In the event that the difference is less than 0.1 times the average force, an output signal on line 159 so indicates. Comparator 158 will utter an output signal over line 161 in the event that the difference signal on line 162 is greater than $0.1 \times AF$ (average force), which is $0.1 \times$ the signal on line 160. If the difference is greater than $0.1 \times AF$ (average force) then 158 outputs a signal on line 161 indicating that this roll is partially covered by the strip i.e., the location of the strip edge. Element 174 is a further check to insure that this signal is correct, by checking its counterpart on the other side of the strip. If the logic indicates that signal 161 is valid then the signal on line 176 switches the difference signal on 170 through to 178. The result is that two signals (one for each strip edge) will be introduced into 182. A companion of the signal on 170 and the second difference signal is performed in comparator 182 to provide a steering signal 184 to center the strip on the mill centerline.

In FIG. 9 the boxes 138, 180 indicate that only one of each of these is employed in the system. As to the other elements, these must be provided for each roll.

While for convenience of reference herein the use of linear arrays of transducers and preferably induction type transducers has been shown, it will be appreciated that the present invention may be employed with other types of noncontacting sensors.

It will be appreciated that the invention is suitable for use in both cold and hot strip rolling mills.

It will be appreciated that the present invention has provided an effective and simple means for monitoring strip tension, lateral position and shape. All of this is accomplished in a manner which permits ready maintenance of the system without requiring major interruption of rolling activity. For example, the mill may be operated with the sensors removed before they have been replaced.

Whereas particular embodiments of the invention have beend described above for purposes of illustration, it will be evident to those skilled in the art that numerous variations of the details may be made without departing from the invention as defined in the appended claims.

We claim:

1. A rolling mill strip tension monitoring assembly comprising
    roll supporting means,
    a plurality of generally axially aligned strip contacting rolls rotatably secured to said roll supporting means,
    noncontacting sensor supporting means,
    sensor means fixedly secured to said sensor supporting means,
    said roll supporting means being relatively movable with respect to said sensor supporting means, whereby movement of said rolls other than axial rotational movement thereof will alter the relative position of said sensor means with respect to said roll supporting means,
    said roll supporting means being rotatably secured to said sensor supporting means,
    said sensor means having transducer means,
    said transducer means being of the inductive type, whereby movement of said rolls other than axial rotation movement will effect a responsive change in the transducer means output signal which permits monitoring of strip tension,
    said transducer means having at least one linear array of transducers,
    said roll supporting means having a shift rotatably secured to said sensor supporting means and a plurality of spaced roll supporting beams projecting from said shaft, and
    each of said rolls being rotatably secured to a pair of said beams.

2. The strip tension monitoring assembly of claim 1 including
    said transducer means having two said transducer arrays.

3. The strip tension monitoring assembly of claim 1 including
    said transducer means having a single linear array of transducers.

4. A rolling mill strip tension monitoring assembly comprising
    roll supporting means,
    a plurality of generally axially aligned strip contacted rolls rotatably secured to said roll supporting means,
    noncontacting sensor supporting means,
    sensor means fixedly secured to said sensor supporting means,
    said roll supporting means being relatively movable with respect to said sensor supporting means, whereby movement of said rolls other than axial rotational movement thereof will alter the relative position of said sensor means with respect to said roll supporting means,
    said roll supporting means being rotatably secured to said sensor supporting means,
    plate means secured to said roll supporting means,
    said plate means being disposed in spaced adjacent position with respect to said sensor means,
    said sensor means having transducer means,
    said transducer means being of the inductive type whereby movement of said rolls other than axial rotation movement will effect a responsive change in the transducer means output signal which permits monitoring of strip tension,
    said transducer means having two transducer arrays,
    one said transducer array being disposed on each side of said plate means,
    said roll supporting means having a shaft rotatably secured to said sensor supporting means and a plurality of spaced roll supporting beams projecting therefrom, and
    each of said rolls being rotatably secured to a pair of said beams.

5. The strip tension monitoring assembly of claim 4 including
    said plate means being generally T-shaped with one leg of said plate means being secured to said beams and the other leg disposed in spaced relationship between said transducer arrays.

6. The strip tension monitoring assembly of claim 4 including
    said sensor supporting means being generally U-shaped having a counterweight and a pair of generally parallel legs, and
    said roll supporting means shaft being rotatably secured to said generally parallel legs.

7. The strip tension monitoring assembly of claim 4 including
   said transducer arrays having separate transducers sensing the position of each of said rolls and
   comparator means responsive to output signals from said transducers for comparing the position of each of said rolls with the position of an adjacent roll.

8. The strip tension monitoring assembly of claim 7 including
   said comparator means having means for comparing the positions of all said rolls.

9. The strip tension assembly of claim 8 including
   said comparator means having means for determining tension in strip being rolled on said mill.

10. The strip tension monitoring assembly of claim 9 including
    said comparator means having means for determining the lateral position of said strip on said rolls.

11. The strip tension monitoring assembly of claim 9 including
    said comparator means having means for determining shape characteristics of said strip from the tension therein.

12. The strip tension monitoring assembly of claim 9 including
    said comparator means having means for emitting a steer signal when said strip is not in the desired position.

13. The strip tension monitoring assembly of claim 4 including
    said sensor means having two sensors per roll for at least two said rolls contactible by opposite edges of the strip for creating a steering signal for said strip.

14. The strip tension monitoring assembly of claim 13 including
    comparator means for comparing the position of one of said rolls with the position of an adjacent roll, and
    said comparator means having means for comparing the output signals from both sensors for each roll and determining the deviation between this comparison signal and a reference signal.

* * * * *

UNITED STATES PATENT AND TRADEMARK OFFICE
CERTIFICATE OF CORRECTION

PATENT NO. : 4,680,978

DATED : July 21, 1987

INVENTOR(S) : VLADIMIR B. GINZBURG and G. BRIAN JONES

It is certified that error appears in the above-identified patent and that said Letters Patent is hereby corrected as shown below:

Column 3, line 14, "sensor 54, 56" should read --sensor arrays 54, 56--.

Column 5, line 43, "beend" should be --been--.

Signed and Sealed this

Twenty-ninth Day of December, 1987

Attest:

DONALD J. QUIGG

Attesting Officer          Commissioner of Patents and Trademarks